(12) United States Patent
Yata

(10) Patent No.: US 9,402,019 B2
(45) Date of Patent: Jul. 26, 2016

(54) AUTOFOCUS SYSTEM

(71) Applicant: FUJIFILM Corporation, Tokyo (JP)

(72) Inventor: Kunio Yata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 13/945,205

(22) Filed: Jul. 18, 2013

(65) Prior Publication Data

US 2013/0300917 A1    Nov. 14, 2013

Related U.S. Application Data

(63) Continuation of application No. PCT/JP2012/050979, filed on Jan. 18, 2012.

(30) Foreign Application Priority Data

Jan. 18, 2011    (JP) .................................. 2011-008333

(51) Int. Cl.
*H04N 5/232*    (2006.01)
*G02B 7/36*    (2006.01)
(Continued)

(52) U.S. Cl.
CPC .............. *H04N 5/23212* (2013.01); *G02B 7/36*
(2013.01); *G02B 7/38* (2013.01); *G03B 13/36*
(2013.01)

(58) Field of Classification Search
CPC . H04N 5/23212; H04N 5/23219; G02B 7/36; G02B 7/38; G03B 13/16
USPC ......... 348/169, 335, 345, 347, 349, 352, 363, 348/369, 208.12, 208.14; 396/63, 65, 77, 396/78, 79, 80, 81, 82, 153
See application file for complete search history.

(56) References Cited

U.S. PATENT DOCUMENTS 5,629,735 A * 5/1997 Kaneda et al. ................ 348/350
6,166,770 A * 12/2000 Yasuda ......................... 348/350
7,929,042 B2 * 4/2011 Terashima .................... 348/345
(Continued)

FOREIGN PATENT DOCUMENTS

EP    2037320    3/2009
EP    2246721    11/2010
(Continued)

OTHER PUBLICATIONS

International Search Report, PCT/JP2012/050979, May 1, 2012.
(Continued)

*Primary Examiner* — Lin Ye
*Assistant Examiner* — Chriss Yoder, III
(74) *Attorney, Agent, or Firm* — Young & Thompson

(57) ABSTRACT

An autofocus system includes: an imaging unit which captures an image of an object formed by an optical system; an autofocus portion which performs focus adjustment of the optical system on an autofocus area set in the image captured by the imaging unit so that the object within the autofocus area comes into focus; an AF area tracking processing portion which performs tracking processing to set a predetermined object within the autofocus area as a target to be tracked, detect a presence area of the target to be tracked in an image newly captured by the imaging unit and determine the presence area as a new autofocus area; a depth-of-field computing portion which calculates a depth of field based on information acquired from the optical system; and a control portion as defined herein.

8 Claims, 5 Drawing Sheets

(51) Int. Cl.
*G02B 7/38* (2006.01)
*G03B 13/36* (2006.01)

(56) References Cited

U.S. PATENT DOCUMENTS

| | | | |
|---|---|---|---|
| 8,000,591 B2 | 8/2011 | Karasawa | |
| 8,068,164 B2 * | 11/2011 | Kumagai | G03B 13/30 348/345 |
| 2007/0212051 A1 * | 9/2007 | Moriya | 396/147 |
| 2009/0141141 A1 | 6/2009 | Onozawa | |

FOREIGN PATENT DOCUMENTS

| | | |
|---|---|---|
| JP | 03-077481 | 4/1991 |
| JP | 3-259671 | 11/1991 |
| JP | 2005-062243 | 3/2005 |
| JP | 2007249132 | 9/2007 |
| JP | 2009-246700 | 10/2009 |
| JP | 4418344 | 12/2009 |
| JP | 2010-183145 | 8/2010 |
| JP | 2010-230870 | 10/2010 |

OTHER PUBLICATIONS

International Preliminary Report on Patentability—PCT/JP2012/050979, May 10, 2013.

Japanese Office Action dated Mar. 3, 2015 in corresponding Japanese Patent Application No. 2012-553757 with partial English translation of Japanese Office Action.

Supplementary European Search Report dated Mar. 4, 2015 in corresponding European Patent Application No. 12737169.

Japanese Office Action dated Sep. 8, 2015 in corresponding Japanese Patent Application No. 2012-553757 with English translation of Japanese Office Action.

* cited by examiner

IMAGING AREA

AUTOFOCUS SYSTEM

CROSS REFERENCE TO RELATED APPLICATION

This is a continuation of International Application No. PCT/JP2012/050979 filed on Jan. 18, 2012, and claims priority from Japanese Patent Application No. 2011-008333 filed on Jan. 18, 2011, the entire disclosures of which are incorporated herein by reference.

TECHNICAL FIELD

The present invention relates to an autofocus system provided with an automatic tracking function of defining an object within an autofocus (AF) area as an object to be tracked and updating the AF area according to the position of the object to be tracked.

BACKGROUND ART

There is known a television camera system for broadcasting use or business use, provided with an autofocus function of automatically focusing on an object within a specific imaging area. This type camera system generally uses contrast-method AF which is performed by detecting the height of contrast of a captured image and controlling the focus of a capturing optical system to maximize (locally maximize) the contrast.

As to focusing by AF, focusing is generally performed not on the entire screen of the captured image but on an object within an area (autofocus area) which is a part of the captured image. That is, in the contrast method, focus adjustment is performed to maximize the contrast of the captured image (object image) within the autofocus area.

An autofocus system with an automatic tracking function as shown in Patent Literature 1 is known as a system to achieve the autofocus function. The autofocus system in Patent Literature 1 uses an AF mode in which either of a fixation mode to turn off the automatic tracking function and a tracking mode to turn on the automatic tracking function is selected by an operation of a user.

CITATION LIST

Patent Literature
Patent Literature 1: Japanese Patent No. 4418344

SUMMARY OF INVENTION

Problem to be Solved by the Invention

Incidentally, in the autofocus system with the automatic tracking function, mistracking is apt to occur when the angle of view is changed to a wide angle side by zooming in a state where automatic tracking is performed. When the angle of view is then changed from the wide angle side to a telephoto side, there is a possibility that another object than the intended object will be tracked.

Moreover, even if an object within an autofocus area is in focus, there is a possibility that the object will be out of focus when the angle of view is then changed by zooming.

In the camera in Patent Literature 1, mistracking is apt to occur when the angle of view is changed by zooming because the automatic tracking function cannot be automatically switched on/off in accordance with the change in the angle of view by zooming.

The invention provides an autofocus system provided with an automatic tracking function, in which occurrence of mistracking can be suppressed when the angle of view is changed by zooming.

Means for Solving the Problem

An autofocus system according to the invention includes:
an imaging unit which captures an image of an object formed by an optical system;
an autofocus portion which performs focus adjustment of the optical system on an autofocus area set in the image captured by the imaging unit so that the object within the autofocus area comes into focus;
an AF area tracking processing portion which performs tracking processing to set a predetermined object within the autofocus area as a target to be tracked, detect a presence area of the target to be tracked in an image newly captured by the imaging unit and determine the presence area as a new autofocus area;
a depth-of-field computing portion which calculates a depth of field based on information acquired from the optical system; and
a control portion which controls execution of the focus adjustment by the autofocus portion and the tracking processing by the AF area tracking processing portion based on the depth of field calculated by the depth-of-field computing portion.

Advantageous Effects of Invention

According to the invention, it is possible to provide an autofocus system provided with an automatic tracking function, in which occurrence of mistracking can be suppressed when the angle of view is changed by zooming.

EMBODIMENTS FOR CARRYING OUT THE INVENTION

An embodiment of an autofocus system with an automatic tracking function according to the invention will be described below with reference to the drawings.

Figure 1:
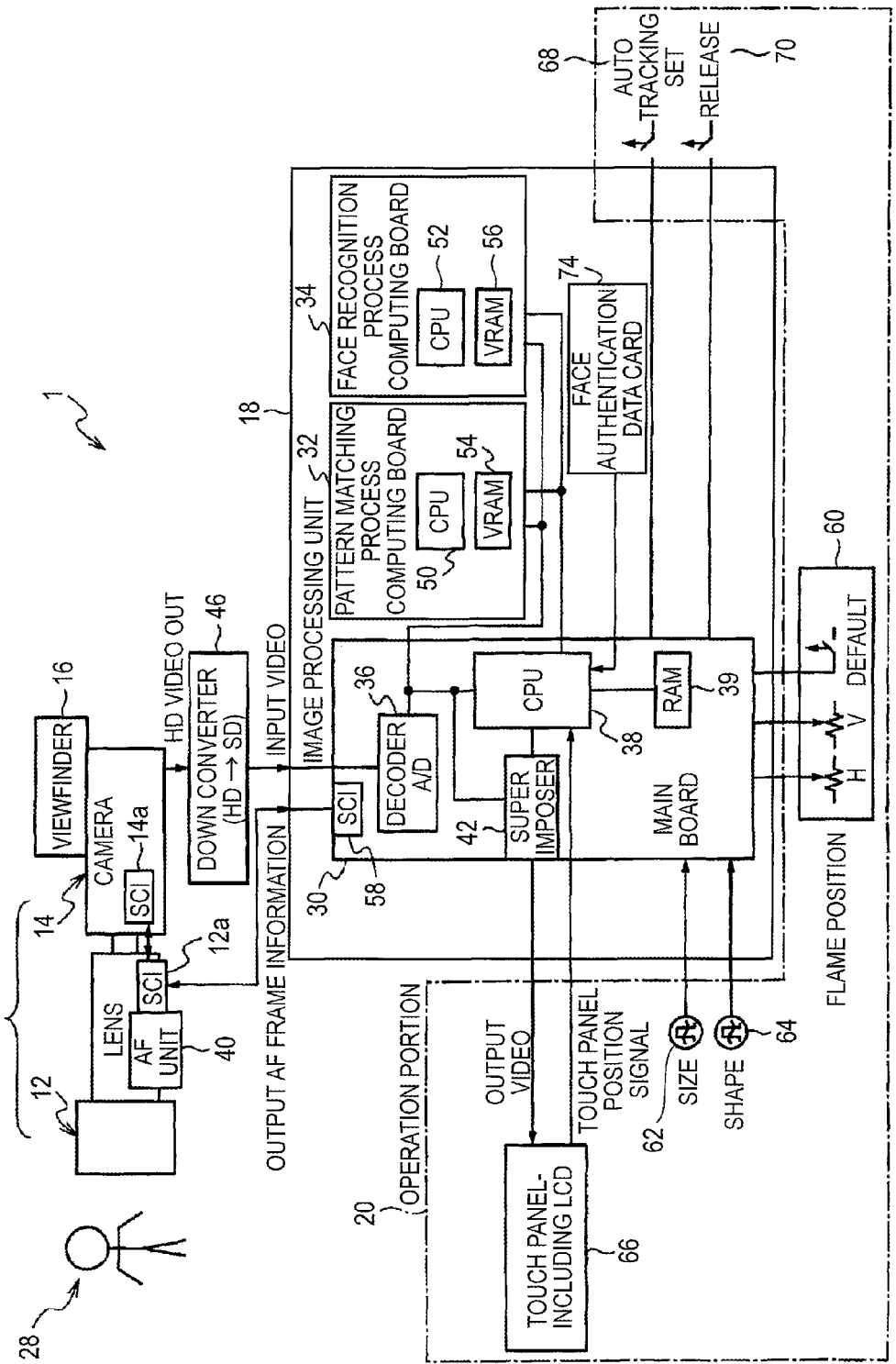
FIG. 1 A block diagram showing an overall configuration of a video camera system for explaining an autofocus system according to an embodiment of the invention.

FIG. 1 is a block diagram showing an overall configuration of a video camera system for explaining the autofocus system according to the embodiment of the invention. For example, this video camera system is used for capturing an image with a television camera for broadcasting use or business use.

As shown in FIG. 1, the video camera system 1 includes a television camera 10, an image processing unit 18 constituting an AF area tracking processing portion performing automatic tracking, and an AF frame operation portion 20.

The television camera 10 includes a camera body 14 made of an HD camera corresponding to a high-definition television (HD TV) system, and a lens device 12 having an imaging lens (optical system) attached to a lens mount of the camera body 14.

An image sensing device (for example, a CCD image sensing device), a required signal processing circuit, etc. are mounted in the camera body 14. An image formed by the imaging lens of the lens device 12 is photoelectrically converted by the image sensing device and then subjected to required signal processing by the signal processing circuit, so that the image is outputted as an HDTV-system video signal (HDTV signal) to the outside from a video signal output terminal, etc. of the camera body 14.

A viewfinder 16 is further mounted in the camera body 14 so that each image captured by the television camera 10 is displayed on the viewfinder 16. Various kinds of information other than the captured image is further displayed on the viewfinder 16. For example, an image (frame image) indicating an AF frame which is the contour of the currently set autofocus area is displayed while superimposed on the captured image.

The lens device 12 has an imaging lens (zoom lens) attached to the lens mount of the camera body 14 so that an image of an object 28 is formed on an imaging surface of an image sensing device of the camera body 14 by the imaging lens. Though not shown, movable portions for adjusting imaging conditions such as a focus lens group, a zoom lens group, a diaphragm, etc. are provided as constituent elements of the imaging lens. These movable portions are electrically driven by a motor (servo mechanism). For example, the focus lens group and the zoom lens group move in an optical axis direction so that the focus (object distance) is adjusted by the movement of the focus lens group while the focal distance (zoom ratio) is adjusted by the movement of the zoom lens group.

Incidentally, as long as at least the focus lens group can be electrically driven, the other movable portions may be driven only manually in the system concerned with autofocus adjustment.

An AF unit 40 and a lens CPU not shown, etc. are further mounted in the lens device 12. The lens CPU generally controls the lens device 12 as a whole. The AF unit 40 is a processing portion for acquiring information necessary for focus control (automatic focus adjustment) based on the autofocus adjustment. Though not shown, an AF processing portion, an AF imaging circuit, etc. constitute the AF unit 40.

The AF imaging circuit is disposed in the lens device 12 in order to acquire a video signal for AF processing. The AF imaging circuit has an image sensing device (referred to as AF image sensing device) such as a CCD image sensing device, and a processing circuit which outputs an output signal of the AF image sensing device as a video signal with a predetermined format. Incidentally, the video signal outputted from the AF imaging circuit is a luminance signal.

Object light incident on the image sensing device of the camera body 14 is branched by a half mirror or the like disposed on an optical path of the imaging lens, so that an image of the branched object light is formed on the imaging surface of the AF image sensing device. The imaging area and the object distance (the distance to the object coming into focus) in the AF image sensing device are formed to be coincident with the imaging area and the object distance in the image sensing device of the camera body 14, so that the object image taken in by the AF image sensing device is coincident with the object image taken in by the image sensing device of the camera body 14. Incidentally, the imaging ranges of the two image sensing devices do not need to be perfectly coincident with each other. For example, the imaging range of the AF image sensing device may be a larger range including the imaging range of the image sensing device of the camera body 14.

The AF processing portion acquires a video signal from the AF imaging circuit, and calculates a focus evaluation value indicating the level of contrast of an object image within the autofocus area based on the video signal. For example, after a high frequency component signal is extracted by a high pass filter from the video signal obtained from the AF image sensing device, a signal of an image of the autofocus area set as will be described later, among the high frequency component signal, is integrated scene by scene (frame by frame). The integrated value obtained thus scene by scene indicates the level of contrast of the image of the autofocus area. The integrated value is given as a focus evaluation value to the lens CPU.

The lens CPU acquires information of an AF frame (AF frame information) indicating contour information (position, size, shape etc.) of the autofocus area from the image processing unit 18 as will be described later, and designates the autofocus area designated by the AF frame information as a target range for AF processing. The focus evaluation value obtained based on the image (video signal) of the autofocus area is acquired from the AF processing portion.

Whenever the video signal for one scene is acquired thus from the AF imaging circuit (whenever a focus evaluation value is obtained by the AF processing portion), the focus evaluation value is acquired from the AF processing portion and the focus lens group is controlled to maximize (locally maximize) the acquired focus evaluation value, that is, to maximize the contrast of the object image within the autofocus area. For example, a mountain-climbing method is generally known as the focus lens group controlling method based on the focus evaluation value. The focus lens group is moved in a direction of increasing the focus evaluation value. When a point at which the focus evaluation value begins to decrease is detected, the focus lens group is set at that position. In this manner, the object within the autofocus area is brought into focus automatically.

Although the aforementioned AF processing portion acquires a video signal from the AF image sensing device mounted in the lens device 12 in order to calculate the focus evaluation value, configuration may be made so that the aforementioned AF processing portion acquires a video signal of each image captured by the image sensing device of the camera body 14 from the camera body 14. In addition, any AF unit may be used as long as the AF unit can automatically focus on an object within the autofocus area.

Figure 2:
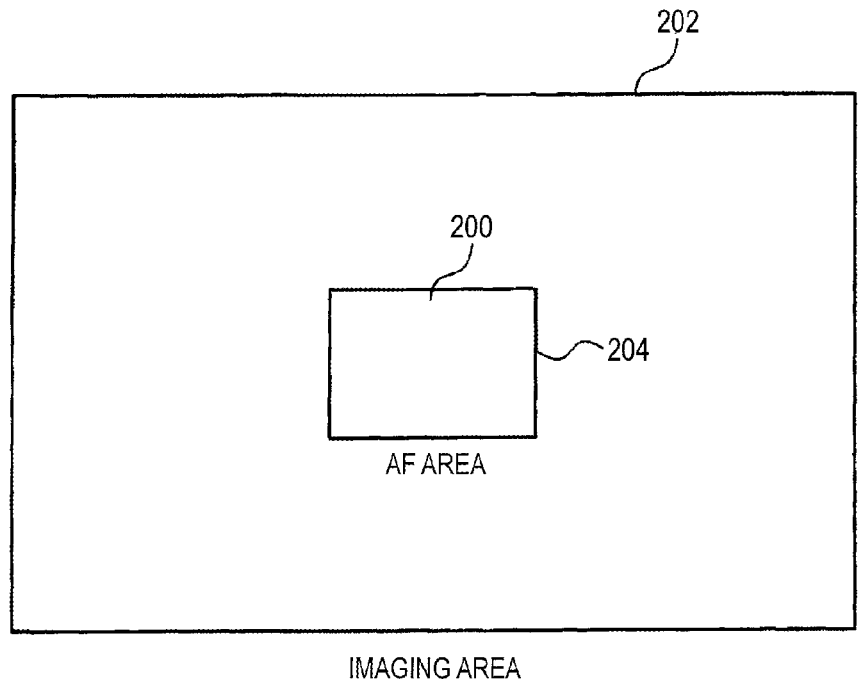
FIG. 2 A view for explaining an example of an autofocus area in the autofocus system according to the embodiment of the invention.

Next, the autofocus area in the autofocus system according to the embodiment of the invention will be described. FIG. 2 is a view showing an example of the autofocus area in the autofocus system according to the embodiment of the invention. As shown in FIG. 2, an autofocus area 200 is set as a quadrilateral area with respect to an imaging area 202 (or an imaging range) of the image sensing device in the camera body 14. The contour of the autofocus area 200 is indicated as an AF frame 204. In the autofocus system according to the embodiment of the invention, an object to be imaged within the autofocus area 200 (area within the AF frame 204) of the image sensing device is brought into focus.

Incidentally, this specification is placed on the assumption that the autofocus area 200 relative to the imaging area 202 is determined based on three factors, i.e. the position, size and shape (aspect ratio) of the contour (AF frame 204) of the autofocus area 200 and the autofocus area 200 is changed when at least one of the three factors, i.e. the position, size and shape of the AF frame 204 is changed.

In addition, the lens device 12 is connected to the camera body 14 through a cable or directly so that various information can be exchanged between the lens device 12 and the camera body 14 through serial communication interfaces 12a and 14a provided respectively in the lens device 12 and the camera body 14. In this manner, information of the AF frame set currently in the AF unit 40 is also transmitted to the camera body 14, and an image of the AF frame corresponding to the position, size and shape of the AF frame set currently in each video image displayed on the viewfinder 16 by processing in the camera body 14 is displayed while superimposed on the video image.

The image processing unit 18 is a processing portion for designating the autofocus area (the position, size and shape (aspect ratio) of the AF frame) set in the AF unit 40 of the lens device 12 by manual operation or automatic tracking processing which will be described later. For example, the image processing unit 18 is received in a not-shown housing and placed in a side portion of a barrel of the imaging lens of the lens device 12, an outer wall surface of the housing of the camera body 14 etc. Incidentally, the position where the image processing unit 18 is placed in the lens device 12 or the camera body 14 is not limited thereto but may be any other arbitrary position. In addition, the image processing portion 18 may be disposed in a portion other than the lens device 12 or the camera body 14.

The image processing unit 18 has an SCI 58. The SCI 58 is connected to the lens device 12 so the SCI 58 can exchange various signals with the lens CPU through the SCI 12a. In this manner, AF frame information for designating the autofocus area 200 is given to the lens CPU of the lens device 12 from the image processing unit 18 so that the autofocus area 200 in the AF unit 40 is set based on the AF frame information.

In addition, a video input connector for importing a video signal is provided in the image processing unit 18. A video output connector of the camera body 14 is connected to the video input connector through a down converter 46. In this manner, an HDTV signal outputted from the video output connector of the camera body 14 is converted (down-converted) into a standard television (NTSC (National Television System Committee) type video signal (SDTV signal) and inputted to the image processing unit 18.

Although details will be given later, the image processing unit 18 performs processing for fetching each captured image corresponding to one frame sequentially from the video signal inputted from the camera body 14 and detecting an object as a predetermined target to be tracked from the captured image when automatic tracking processing is executed. The image processing unit 18 determines the autofocus area 200 so as to bring the object into focus by AF, and then transmits information of the determined autofocus area 200 to the lens CPU of the lens device 12. Incidentally, the configuration and processing contents of the image processing unit 18 will be described later.

The AF frame operation portion 20 is provided as a device integrated with the image processing unit 18. A touch panel-including liquid crystal display (LCD) 66 which will be described later is configured to be detachable from the image processing unit 18. Incidentally, the AF frame operation portion 20 may be provided in such a form that the AF frame operation portion 20 is partially or entirely formed as a separate device from the image processing unit 18 and connected to the image processing unit 18 by a cable etc.

The AF frame operation portion 20 is an operation portion for mainly performing operation concerned with control of the AF frame. The AF frame operation portion 20 is provided with an operation member by which an operator can input an instruction of the autofocus area 200 by manual operation, and an operation member by which operation concerned with automatic tracking for automatically tracking a desired object can be performed.

Although the details will be omitted, the AF frame operation portion 20 includes a position operation member 60 (for example, a joystick or a trackball) for moving the position of the autofocus area (the position of the AF frame) up, down, left and right by user's manual operation, a size operation member 62 (for example, a knob) for changing the size of the autofocus area (the size of the AF frame) by manual operation, a shape operation member 64 (for example, a knob) for changing the shape of the autofocus area (the shape of the AF frame) by manual operation, a tracking start switch 68 for issuing an instruction to start automatic tracking, and a tracking stop switch 70 for issuing an instruction to stop automatic tracking. The setting statuses of the operation members 60, 62, 64, 68 and 70 are read by a CPU 38 of a main board 30 in the imaging processing unit 18.

In addition, the touch panel-including liquid crystal display (hereinafter referred to as "LCD") is provided in the AF frame operation portion 20. The LCD 66 is configured so that setting of a mode concerned with automatic tracking etc. can be inputted by touch operation (tap) on the LCD 66. An image displayed on the LCD 66 can be switched suitably in accordance with the setting contents by the CPU 38 of the image processing unit 18.

Incidentally, in the case where only automatic tracking based on an automatic tracking mode which will be described later is performed in this embodiment, part or all of the operation members 60, 62, 64, 68 and 70 of the AF frame operation portion 20 can be dispensed with. In addition, the LCD 66 can be also dispensed with. According to the automatic tracking mode which will be described later, automatic tracking can be performed without necessity of any operation on the operation members 60, 62, 64, 68 and 70 and the LCD 66. The embodiment can be preferably applied to a small-sized camera such as a handy camera in which it is difficult to spare a space for installing the AF frame operation device. If the space is not a problem and there is no influence on the operability, configuration can be made in such a manner that part or all of the operation members 60, 62, 64, 68 and 70 or the LCD 66 are provided suitably so that the position of the AF frame can be changed manually.

The configuration and processing contents of the image processing unit 18 will be described below.

The image processing unit 18 includes a main board 30, a pattern matching process computing board 32, and a face recognition process computing board 34. CPUs 38, 50 and 52 are mounted in the main board 30, the pattern matching process computing board 32, and the face recognition process computing board 34 respectively. Arithmetic processing is performed individually in each board. The CPUs 38, 50 and 52 are connected by a bus or a control line so that exchange of data, synchronization of arithmetic processing, etc. among the CPUs 38, 50 and 52 can be attained.

Processing in the image processing unit 18 is generally controlled in the main board 30. In addition to the CPU 38 for performing arithmetic processing, the SCI 58, a decoder (A/D converter) 36, a super imposer 42, a RAM 39 etc. are mounted in the main board 30.

The SCI 58 is an interface circuit for performing serial communication with the SCI 12a of the les device 12, as described above. The SCI 58 transmits the AF frame information etc. to the lens device 12. In addition, the SCI 58 receives information including a diaphragm value, an object distance, and a focal distance from the lens device 12.

The CPU 38 of the main board 30 performs arithmetic processing for calculating a depth of field using the diaphragm value, the object distance and the focal distance acquired from the lens device 12, and control processing for performing control to execute or stop automatic tracking based on the calculated depth of field. The arithmetic processing and the control processing may be performed by any one of the main board 30, the pattern matching process computing board 32 and the face recognition process computing board 34, or by a separately provided processing operation board (not shown).

The decoder 36 is a circuit for converting a video signal (SDTV signal) of video images of the television camera 10 inputted to the image processing unit 18 from the down converter 46 into data to which digital processing can be applied in the image processing unit 18. The decoder 36 performs A/D conversion processing etc. for converting an analog SDTV signal into a video signal of digital data. The video signal of video images outputted from the decoder 36 is also sent to the pattern matching process computing board 32 and the face recognition process computing board 34 so that the video images captured by the television camera 10 can be acquired as captured images each corresponding to one frame also in the pattern matching process computing board 32 and the face recognition process computing board 34.

Incidentally, the image processing unit 18 is provided with a memory etc. which is readable and writable by the CPU 38 and which can be used suitably for storage of processing data etc. In addition, information about the position, size and shape of the autofocus area set in the AF frame setting processing in the automatic tracking mode which will be described later is stored in this memory. It is preferable that the setting information about the position, size and shape of the autofocus area can be changed by a predetermined operation of the AF frame operation portion 20 in accordance with user's (cameraman's) preference.

The super imposer 42 is a circuit which combines a video signal of captured video images obtained from the decoder 36 with an image signal generated by the CPU 38 and outputs/displays the combined video signal to/on the LCD 66. In this manner, the video images captured by the television camera 10 can be displayed on the LCD 66 in the same manner as on the viewfinder 16 mounted in the camera body 14. At the same time, an image of the currently set autofocus area, a menu screen (menu image) etc. on which an input operation is allowed to be performed through the touch panel, etc. can be displayed on the LCD 66 while superimposed on the captured video images. Incidentally, it is a matter of course that only the image generated by the CPU 38 can be displayed while not superimposed on the captured video images.

The RAM 39 is a memory which temporarily stores data used in arithmetic processing of the CPU 38.

The pattern matching process computing board 32 and the face recognition process computing board 34 are computing boards for individually performing pattern matching and face detection/authentication process. The pattern matching process computing board 32 and the face recognition process computing board 34 are provided with the CPUs 50 and 52 which perform arithmetic processing, VRAMs 54 and 56 which temporarily store image data respectively, etc.

In addition, a slot (not shown) into which a face authentication data card 74 is loaded as an external memory such as an SD (Secure Digital) card, a USB memory, etc. is provided in the image processing unit 18. When the face of a specific person is detected by face recognition, recognition data indicating the face of the specific person are stored in advance in the face authentication data card 74. When the face authentication data card 74 is loaded into the slot, the CPU 38 can read authentication data required for face recognition from the face authentication data card 74.

Successively, control of the autofocus area performed by the image processing unit 18 configured as described above will be described in conjunction with processing concerned with display and operation of the LCD 66.

Figure 3:
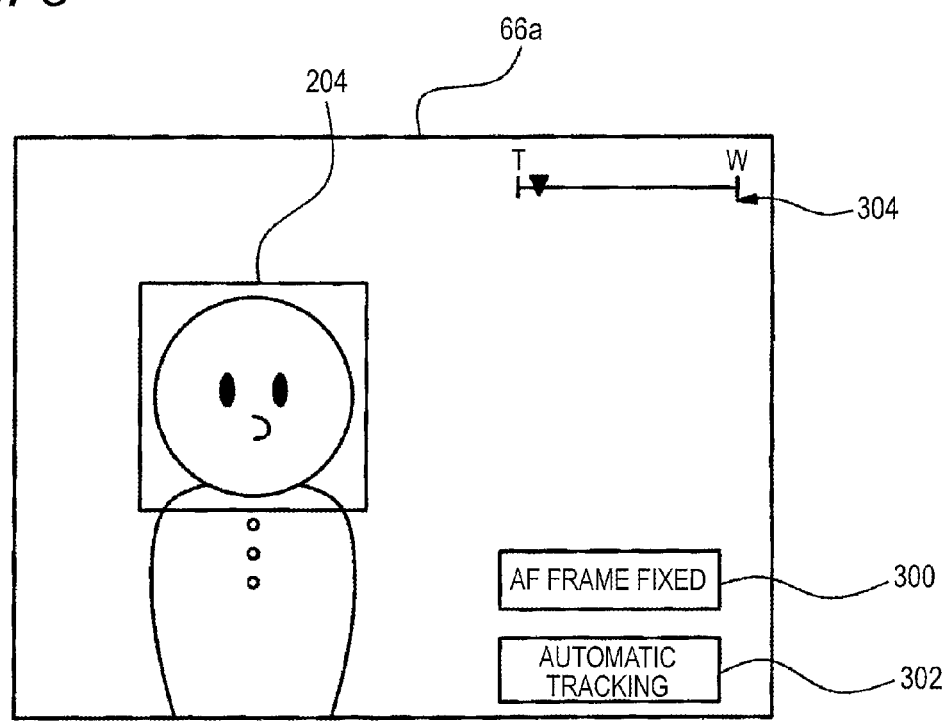
FIG. 3 A view showing an example of a screen displayed on a touch panel-including liquid crystal display in the video camera system in FIG. 1.

FIG. 3 is a view showing an example of a screen displayed on the touch panel-including liquid crystal display in the autofocus system according to the embodiment of the invention.

As shown in FIG. 3, a menu screen (menu image) including various buttons 300 and 302, and an AF frame 204 indicating an autofocus area 200 (see FIG. 2) set currently are displayed on a screen 66a of the LCD 66 while superimposed on a video image captured by the television camera 10. Images superimposed on the captured video image, like the various buttons 300 and 302 of the menu screen and the AF frame 204, are generated by the CPU 38 of the main board 30 in the image processing unit 18 shown in FIG. 1. Those images are displayed on the LCD 66 while superimposed on the video image which is captured by the television camera 10 and which is outputted from the decoder 36 in the super imposer 42. Incidentally, control concerned with display (display contents) of the LCD 66 is performed by the CPU 38.

In addition, an indicator 304 visually indicating an angle of view of the lens based on information acquired from the lens device 12 is provided in the screen 66a of the LCD.

On the other hand, the LCD 66 is provided with a touch panel. When a touch operation is performed so that the screen 66a of the LCD 66 is touched with a finger etc., position information indicating the touched position (coordinates) is given to the CPU 38. In this manner, the position and operation kind (tap, double-tap, etc.) of the touch operation performed on the screen 66a of the LCD 66 are detected by the CPU 38. Processing in accordance with this operation is executed by the CPU 38.

As basic operations in the screen 66a of the LCD 66, there are an operation for inputting an instruction assigned in advance to each of the buttons 300 and 302, and an operation for designating the autofocus area (area enclosed by the AF frame 204). The former operation is performed by tapping the position of the button 300 or 302 with a finger etc. The latter operation for designating the autofocus area is performed, for example, in such a manner that when a position to which the autofocus area is intended to be moved is tapped on the screen 66a of the LCD 66 on which each captured video image is displayed, the autofocus area can be moved so that the position comes to the center. In addition, an apex or a side of the AF frame 204 indicating the contour of the autofocus area can be moved to a position to where the touched apex or side is dragged by a dragging operation for touching the apex or side with a finger etc. and sliding the apex or side, so that the position, size and shape of the autofocus area can be changed.

Incidentally, the position, size and shape of the autofocus area can be changed by operations of the position operation member 60, the size operation member 62 and the shape operation member 64 in the AF frame operation portion 20.

To describe the menu screen (menu image) displayed on the screen 66a of the LCD 66, a fixation mode selection button 300 indicated as "AF frame fixed", and an automatic tracking mode selection button 302 indicated as "automatic tracking" are buttons for selecting an autofocus control mode in FIG. 3. When one of these buttons 300 and 302 is tapped, a desired mode can be selected from the fixation mode and the automatic tracking mode.

The fixation mode is a mode (manual mode) in which an operator designates an autofocus area (the position, size and shape) by a manual operation and an AF frame is displayed in the designated position so that the autofocus area is fixed. This fixation mode is a mode useful for capturing images in a news program for which the camera is hardly moved.

When the fixation mode selection button 300 is tapped on the screen 66a of the LCD 66 in FIG. 3, the fixation mode is selected so that the CPU 38 mounted in the main board 30 of the image processing unit 18 executes processing of the fixation mode.

That is, the CPU 38 determines the autofocus area based on an operation on the screen 66a of the LCD 66 for changing the autofocus area or an operation on an operation member (the position operation member 60, the size operation member 62 or the shape operation member 64) for changing the AF frame 204 provided in the AF frame operation 20 by a manual operation, as described above. Upon determination of the autofocus area, the CPU 38 transmits AF frame information indicating contour information of the autofocus area to the lens CPU of the lens device 12 through the SCI 58.

The automatic tracking mode is a mode for performing processing to set a predetermined object within the autofocus area, detect a presence area of the target to be tracked in an image newly captured by the imaging unit and determine the presence area as a new autofocus area. The automatic tracking mode has a plurality of modes including an "object tracking mode", a "face detection tracking mode", a "face recognition tracking mode", and a "fully automatic tracking mode". After the automatic tracking mode is selected on the screen 66a of the LCD 66, a desired mode is further selected by a user from the "object tracking mode", the "face detection tracking mode", the "face recognition tracking mode" and the "fully automatic tracking mode". Incidentally, configuration may be made so that a desired mode can be selected by a user from the "object tracking mode", the "face detection tracking mode", the "face recognition tracking mode" and the "fully automatic tracking mode" in the menu screen of the screen 66a of the LCD 66.

The object tracking mode is a mode for tracking an arbitrary object. At least part of the object set as the target to be tracked is displayed to be enclosed in the AF frame. The object tracking mode is a mode useful for capturing each image in horse racing broadcasting, car racing broadcasting, or the like for tracking an object other than a person's face. When an operator designates the autofocus area so that an image of an arbitrary object the operator wants to set as the target to be tracked is included in each of captured video images in this mode, the object within the autofocus area enclosed by the AF frame is set as the target to be tracked. The image of the target to be tracked is registered as a reference pattern and a pattern matching process for detecting an image range coincident with the reference pattern is performed on the sequentially obtained captured images in the CPU 50 of the pattern matching process computing board 32. The CPU 38 of the main board 30 determines the range where the reference pattern is detected as a new autofocus area, and transmits information about the autofocus area to the lens CPU of the lens device 12. Incidentally, when focus control based on AF is not performed in the lens device 12 while object automatic tracking starts (when it is not in the AF mode), an instruction to start AF is also issued in conjunction with the start of the object automatic tracking.

The face detection tracking mode is a mode for tracking a face of an arbitrary person with the AF frame. A face area of the person set as the target to be tracked is displayed as the autofocus area to be enclosed with the AF frame. The face detection tracking mode is a mode useful for capturing images in a song program or the like for detecting and tracking a person's face. In this mode, first, well-known face detection processing for detecting a face image of an arbitrary person from each captured image is performed in the CPU 52 of the face recognition process computing board 34. When an operator designates a face image which is to be set as the target to be tracked from the detected face image, the designated face image is set as the target to be tracked. Then, face detection processing is performed on sequentially obtained captured images by the CPU 52 of the face recognition process computing board 34, and processing for identifying the face image of the target to be tracked from the detected face images is performed by the CPU 38 of the main board 30. The CPU 38 of the main board 30 determines the range of the detected face image of the target to be tracked as a new autofocus area and transmits information about the autofocus area to the lens CPU of the lens device 12.

The face recognition tracking mode is a mode for tracking a person's face registered preliminarily as authentication data with the AF frame. The face image of the person registered as the target to be tracked is displayed as the autofocus area to be enclosed with the AF frame. The face recognition tracking mode is a mode useful for capturing images in a song program, sports broadcasting, or the like, in which each person to be imaged is determined preliminarily. In this mode, authentication data of the face of the person set as the target to be tracked is imported from the face authentication data card 74 loaded in the slot (not shown) shown in FIG. 1. Face detection processing is performed in the CPU 52 of the face recognition process computing board 34 is performed in the same manner as in the face detection tracking mode, and the face image of the target to be tracked is detected from detected face images by a well-known face authentication process using the authentication data. The CPU 38 of the main board 30 determines the range of the face image detected by the face recognition process as a new autofocus area, and transmits information about the autofocus area to the lens CPU of the lens device 12.

In the fully automatic tracking mode, well-known face detection processing for detecting a face image of an arbitrary person from captured images is performed in the CPU 52 of the face recognition process computing board 34 in the same manner as in the aforementioned face detection tracking mode. When the face image of the person is included in the detected face image, the face image does not have to be designated by an operator but can be automatically set as the target to be tracked. When a plurality of face images are included in the captured image on that occasion, a face image which is to be set as the target to be tracked is determined in accordance with the size and position of the face. On the other hand, when the face image of the person is not included in the captured image, automatic tracking based on the aforementioned object tracking mode is executed.

The video camera system 1 configured as described above executes automatic tracking when the automatic tracking mode is selected. When automatic tracking is performed, a depth of field is calculated based on information obtained from the lens device 12 and control is made to execute or stop automatic tracking based on the depth of field. In this manner, mistracking can be avoided even when the angle of view for capturing an image is changed to the wide angle side by zooming of the lens device 12 at the time of execution of automatic tracking.

Figure 4:
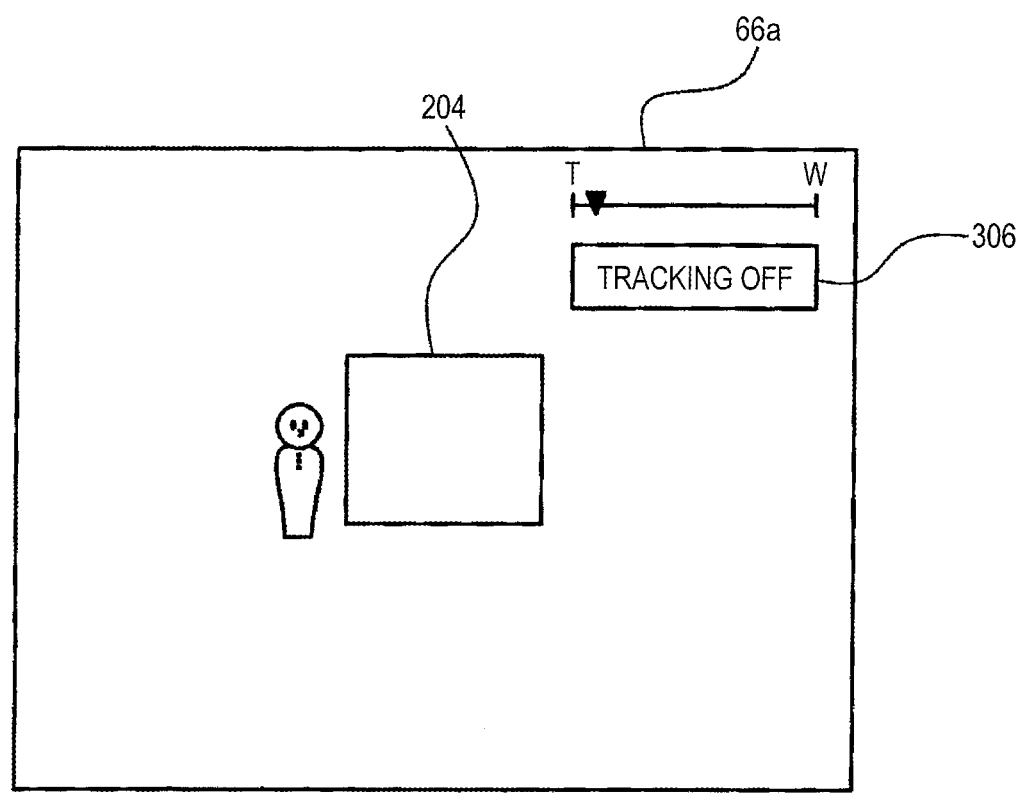
FIG. 4 A view showing an example of the screen displayed on the LCD when automatic tracking is stopped.

FIG. 4 shows an example of a screen displayed on the LCD when automatic tracking is stopped. When an object as a target to be tracked becomes small in the case where zooming is set at a wide angle as shown in FIG. 4, contrast with a sufficient level cannot be obtained in the set autofocus area even if the autofocus area is set in accordance with the object. In such a case, the depth of field is so deep that execution of automatic tracking is automatically stopped based on the depth of field. The autofocus area is changed to a predetermined position (for example, the center of the imaging area) so that the AF frame 204 representing the contour of the changed autofocus area is displayed while superimposed on the screen 66a. In addition, a tracking stop mark 306 visually indicating the stop of automatic tracking is displayed on the screen 66a. When automatic tracking is stopped, it is arbitrary that either autofocus is performed or the lens is fixed to a previous focus position. As will be described later, execution or stop of autofocus adjustment may be controlled based on the depth of field.

When automatic tracking is stopped, autofocus adjustment is performed on an object in the predetermined position of the imaging area (for example, the center of the imaging area).

Successively, processing when the automatic tracking mode performed by the image processing unit 18 is selected will be described. Incidentally, processing of the face recognition tracking mode will be described as follows by way of example.

Figure 5:
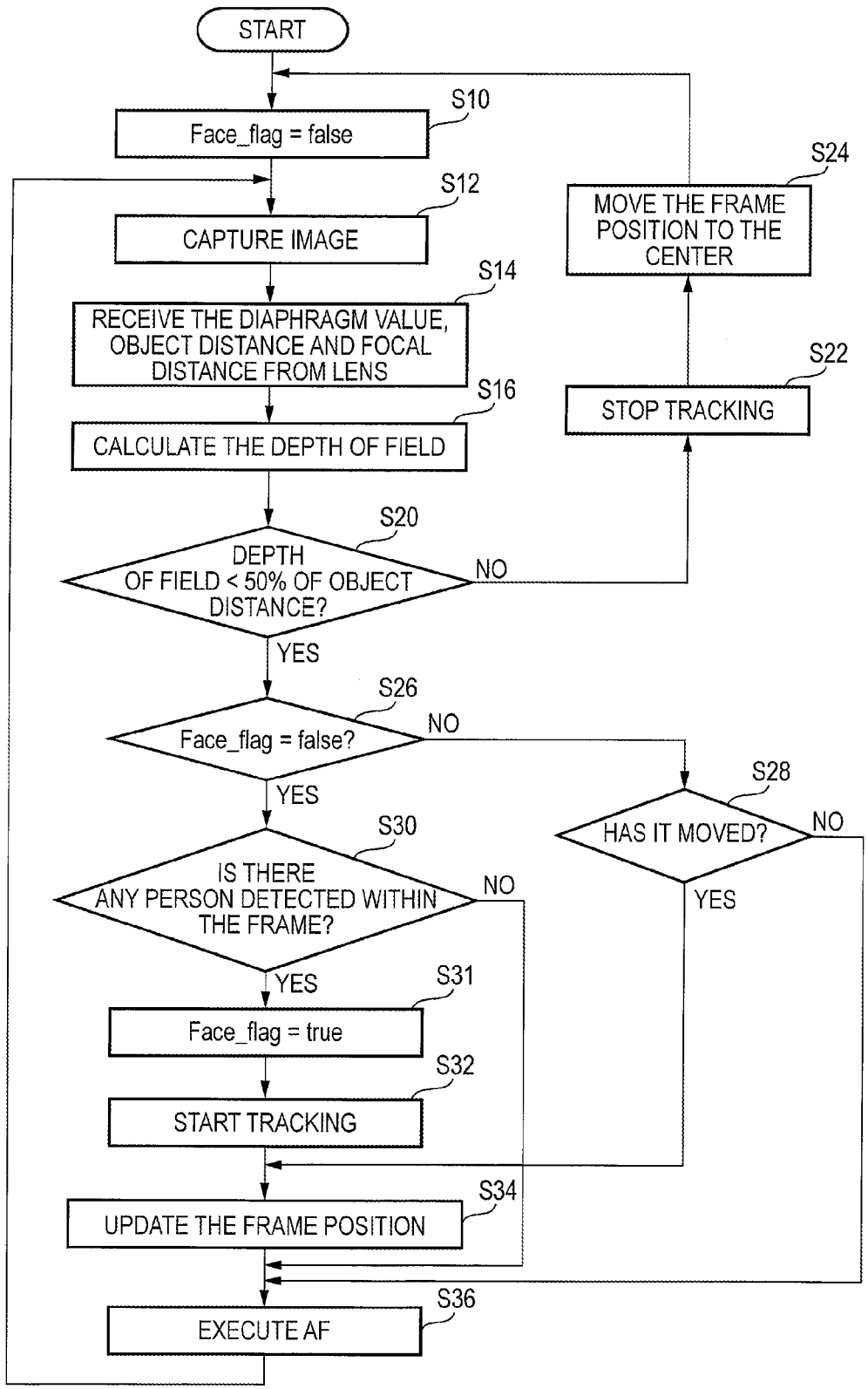
FIG. 5 A flowchart showing a processing procedure in an automatic tracking mode in the autofocus system according to the embodiment of the invention.

FIG. 5 is a flow chart showing a processing procedure when the automatic tracking mode in the CPU of the image processing unit is selected.

When the automatic tracking mode is selected by a predetermined operation, first, the CPU 38 of the main board 30 performs AF frame setting processing to set an autofocus area at a predetermined initial position. A flag (Face_flag) indicating whether face recognition is performed or not is set to be false (step S10). In the AF frame setting processing, the autofocus area in an imaging range (imaging area) is set based on information about the position, size and shape of the initially set autofocus area stored in the memory (not shown) of the main board 30. AF frame information indicating the information (the position, size and shape) of the thus set autofocus area is transmitted to the lens CPU of the lens device 12 through the SCI 58. In this manner, the autofocus area is set in a range designated by the AF frame information in the AF unit 40 of the lens device 12.

Successively, the CPU 52 of the face recognition process computing board 34 imports image data of a captured image corresponding to one frame from the decoder 36 (step S12). The CPU 38 of the main board 30 is notified of the imported image data.

Next, the CPU 38 of the main board 30 acquires the diaphragm value, the object distance and the focal distance from the lens device 12 (step S14). In the step S14, the CPU 38 edits the acquired diaphragm value, object distance and focal distance as data linked to a corresponding face image, and temporarily stores the edited diaphragm value, object distance and focal distance in the RAM 39.

Next, the CPU 38 of the main board 30 executes arithmetic processing to calculate the depth of field using the data including the diaphragm value, the object distance and the focal distance generated in the step S14 (step S16).

In the arithmetic processing in the step S16, the depth of field is calculated as in the following expression (1). In the expression (1), Lr is the rear depth of field and Lf is the front depth of field.

$$\text{Depth of Field} = Lr + Lf \qquad \text{expression (1)}$$

The rear depth of field Lr is calculated as in expression (2). The front depth of field Lf is calculated as in expression (3). In the following expressions, the focal distance of the lens of the lens device 12 is f, the diaphragm value (f-number) is FNo, the permissible circle of confusion is $\delta$, and the object distance is L.

$$\text{Rear Depth of Field } Lr = \frac{\delta \cdot FNo \cdot L^2}{f^2 - \delta \cdot FNo \cdot L} \qquad \text{expression (2)}$$

$$\text{Front Depth of Field } Lf = \frac{\delta \cdot FNo \cdot L^2}{f^2 + \delta \cdot FNo \cdot L} \qquad \text{expression (3)}$$

When a blurring amount of an image is not higher than a certain value in the condition that the image of an object on the optical axis of the lens is formed on the imaging surface (the imaging surface of the image sensing device), it appears as if the lens focuses in a range around the point where the object is brought into focus. A circle having the certain value of the blurring amount of the image on this occasion assumed to be the diameter and the optical axis assumed to be the center is a permissible circle of confusion. Incidentally, the diameter of the permissible circle of confusion changes in accordance with the image size of the image sensing device, the performance of the camera, usage conditions, etc.

In the range where it appears as if the lens focuses, the image forming range of the image forming surface side is referred to as the depth of focus. Incidentally, the depth d of focus can be calculated based on $d = 2\delta \times FNo$.

Incidentally, the depth of field has the following properties.
(i) The depth of field is deeper as the diaphragm value is larger.
(ii) The depth of field is deeper as the focal distance is shorter.
(iii) The depth of field is deeper as the object distance is longer.
(iv) The rear depth of field is deeper than the front depth of field.

Successively to the step S16, the CPU 38 of the main board 30 compares the depth of field calculated in the step S16 with a predetermined threshold to thereby determine whether the depth of field is shallower than the threshold or not (step S20). Here, assume that the threshold is 50% as long as the object distance. When the depth of field is shallower than the threshold, the processing procedure goes to step S26. When the depth of field is not shallower than the threshold, the processing procedure goes to step S22.

When the determination in the step S20 results in NO, the CPU 38 determines that automatic tracking should be stopped, and sets automatic tracking at OFF (step S22). The CPU 38 determines that the autofocus area is moved to a set default position (for example, the center of the captured image), and transmits AF frame information indicating information about the autofocus area to the lens CPU of the lens device 12 through the SCI 58 (step S24). When the processing of the step S24 is completed, the procedure returns to the processing of the step S10.

When the determination in the step S20 results in YES, the CPU 38 determines whether Face_flag is "false" or not (step S26). When Face_flag is "false", the processing procedure goes to step S30. When Face_flag is "true", the processing procedure goes to step S28.

When the determination in step S26 results in YES, the CPU 38 determines whether the face image is detected within the captured image or not by the face detection processing in the step S14 (step S30). When the face image is detected within the captured image, the processing procedure goes to step S32. When the face image is not detected within the captured image, the processing procedure goes to step S36.

When the determination in the step S30 results in YES, the CPU 38 sets Face_flag at "true" (step S31). Successively to the processing of the step S31, the CPU 38 starts automatic tracking (step S32). The CPU 38 sets (updates) the range of the detected face image as a new autofocus area, and transmits AF frame information indicating information about the autofocus area to the lens CPU of the lens device 12 (step S34). The les device 12 executes autofocus adjustment in the new autofocus area based on the AF frame information (step S36). When the processing of the step S36 is completed, the procedure returns to the processing of the step S12.

When the determination in the step S26 results in NO, the CPU 38 determines whether an image of a reference pattern has moved or not, that is, whether an image range in which the reference patter has been detected is different from the currently set autofocus area or not (step S28). Incidentally, even in the case where the size of the image of the reference pattern in the captured image has changed, determination in the determination processing results in YES.

When the determination in the step S28 results in YES, the procedure goes to the processing of the step S34. In the case where the determination in the step S28 results in NO, the procedure goes to the processing of the step S36.

According to the aforementioned video camera system 1, determination is made as to whether an image of a person's face is included in a captured image or not in the automatic tracking mode. When determination is made that the image of the person's face is included in the captured image, the image of the person's face is set as a target to be tracked and automatic tracking based on face detection processing is executed. When the angle of view is changed by zooming on that occasion, determination is made as to whether execution of automatic tracking is allowed or not based on the depth of field. When determination is made that execution of automatic tracking is not allowed, automatic tracking is automatically stopped. When determination is made that execution of automatic tracking is allowed, automatic tracking is executed.

In addition, the video camera system 1 can execute automatic tracking, and control execution or stop of autofocus adjustment based on the depth of field. The video camera system 1 can control execution or stop of autofocus adjustment in parallel with the aforementioned control of automatic tracking.

Figure 6:
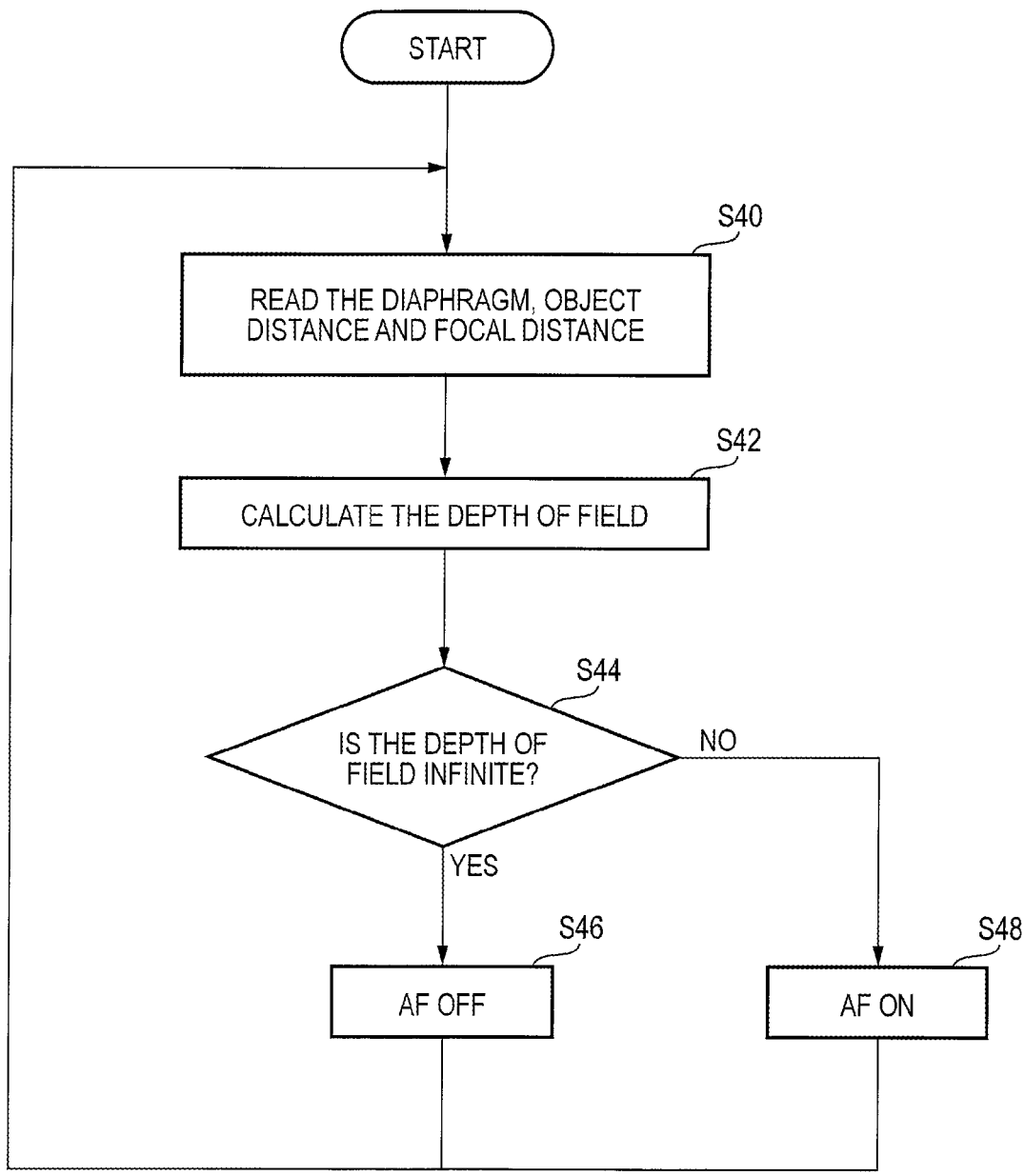
FIG. 6 A flow chart showing a processing procedure of autofocus adjustment control in the autofocus system according to the embodiment of the invention.

FIG. 6 is a flow chart showing a processing procedure when autofocus adjustment is controlled based on the depth of field.

When autofocus is executed, the CPU 38 of the main board 30 brings the object into focus within the autofocus area set by the automatic tracking mode. Successively, the CPU 38 of the main board 30 acquires the diaphragm value, the object distance and the focal distance from the lens device 12 (step S40).

Then, the CPU 38 of the main board 30 executes a computing process for calculating the depth of field by using data including the diaphragm value, the object distance and the focal distance generated in the step S40 (step S42).

Successively to the step S42, the CPU 38 of the main board 30 determines whether the depth of field calculated in the step S40 is infinite or not (step S44). Here, the fact that the depth of field is infinite means that infinity is included in the depth of field as a result of the computing.

When the determination in the step S44 is made that the depth of field is infinite, the processing procedure goes to step S46. When the determination is made that the depth of field is not infinite, the processing procedure goes to step S48.

When the determination in the step S44 results in YES, the CPU 38 sets autofocus adjustment at OFF (step S22). The CPU 38 transmits information indicating stop of autofocus adjustment to the AF unit 40 through the SCI 58 (step S46). When the processing of the step S46 is completed, the procedure returns to the processing of the step S40.

When the determination in the step S44 results in NO, the CPU 38 allows execution of autofocus adjustment (step S48). The AF unit 40 executes autofocus adjustment in the already set autofocus area (step S48). When the processing of the step S48 is completed, the procedure returns to the processing of the step S40.

According to the aforementioned video camera system 1, when autofocus adjustment is performed, an object within a set autofocus area is brought into focus. When the angle of view is changed by zooming on that occasion, determination is made as to whether execution of autofocus adjustment is allowed or not based on the depth of field. When determination is made that execution of autofocus adjustment is not allowed, autofocus adjustment is automatically stopped. In addition, when determination is made that execution of autofocus adjustment is allowed, autofocus adjustment is executed.

In addition, according to the video camera system 1, the SPU 38 of the main board 30 determines whether execution of at least one of automatic tracking and autofocus adjustment is allowed or not, based on the depth of field. When determination is made that the execution is not allowed, control is made to stop the execution. When control is made to automatically turn ON/OFF automatic tracking and autofocus adjustment, mistracking can be prevented from occurring in the following case.

When there is an area in which the lens does not focus in a captured image and there is a moving object in the captured image and when sufficient contrast can be obtained from an image of the object within the autofocus area, control is made to turn ON automatic tracking and turn ON AF.

There may be a case where the lens does not focus at any position of the captured image and there is an object which moves in the imaging range of the captured image. In such a case, it is assumed that execution of autofocus adjustment is not necessary because the depth of field is infinite so that automatic tracking of the object is performed. In such a case, automatic tracking is controlled to be ON and autofocus adjustment is controlled to be OFF.

In the case where there is an area in which the lens does not focus in the captured image and the object as the target to be tracked is too small, sufficient contrast cannot be obtained from the image of the object in the range of the AF area. Therefore, the accuracy of automatic tracking is lowered. In such a case, automatic tracking is controlled to be OFF and autofocus adjustment is controlled to be ON.

In the case where the lens does not focus in any position of the captured image and the object as the target to be tracked is too small, both automatic tracking and autofocus adjustment are controlled to be OFF.

In this specification, the autofocus system is disclosed as follows.

(1) An autofocus system including:

an imaging unit which captures an image of an object formed by an optical system;

an autofocus portion which performs focus adjustment of the optical system on an autofocus area set in the image captured by the imaging unit so that the object within the autofocus area comes into focus;

an AF area tracking processing portion which performs tracking processing to set a predetermined object within the autofocus area as a target to be tracked, detect a presence area of the target to be tracked in an image newly captured by the imaging unit and determine the presence area as a new autofocus area;

a depth-of-field computing portion which calculates a depth of field based on information acquired from the optical system; and a control portion which controls execution of the focus adjustment by the autofocus portion and the tracking processing by the AF area tracking processing portion based on the depth of field calculated by the depth-of-field computing portion.

(2) An autofocus system described in the paragraph (1), wherein:

the control portion makes control not to execute the tracking processing when the depth of field is smaller than a predetermined threshold.

(3) An automatic system described in the paragraph (1) or (2), wherein:

the control portion makes control not to execute the focus adjustment when the depth of field is infinite.

(4) An autofocus system according to any of the paragraphs (1) through (3), wherein:

the depth-of-field computing portion calculates the depth of field based on information about diaphragm value, object distance and focal distance obtained from the optical system.

(5) An autofocus system according to any of the paragraphs (1) through (4), wherein:

the AF area tracking processing portion sets a human image within the autofocus area as a target to be tracked.

INDUSTRIAL APPLICABILITY

The autofocus system according to the invention is provided with an automatic tracking function capable of suppressing occurrence of mistracking when the angle of view is changed by zooming. Accordingly, the autofocus system is useful when it is applied to a digital camera, especially a compact digital camera, a camera-including cellular phone, a camera-including electronic apparatus, an endoscope imaging apparatus, or the like.

The present application is based on Japanese Patent Application No. 2011-8333 filed on Jan. 18, 2011, the contents of which are incorporated herein by reference.

EXPLANATIONS OF REFERENCE SIGNS

1 video camera system
10 television camera
12 lens device
14 camera body
16 view finder
18 image processing unit
20 AF frame operation portion
30 main board
40 AF unit
32 pattern matching process computing board
34 face recognition process computing board
38, 50, 52 CPU
66 liquid crystal display (LCD)

The invention claimed is:

1. An autofocus system comprising:

at least one central processor configured to cause an imaging device to capture an image of an object formed by an optical system, and configured to perform focus adjustment of the optical system on an autofocus area set in the image captured by the imaging device so that the object within the autofocus area comes into focus, perform tracking processing to set a predetermined object within the autofocus area as a target to be tracked, detect a presence area of the target to be tracked in an image newly captured by the imaging unit and determine the presence area as a new autofocus area, calculate a depth of field based on information acquired from the optical system, and individually control whether to execute the focus adjustment and whether to execute the tracking processing, based on the calculated depth of field, wherein the control of whether to execute the tracking processing is based on a comparison of whether the calculated depth of field is shallower than a predetermined threshold corresponding to the distance to the object, and wherein the at least one central processor controls the tracking processing to not be executed when the depth of field is equal to or deeper than the predetermined threshold.

2. The automatic system as claimed in claim 1, wherein the at least one central processor controls the focus adjustment to not be executed when infinity is included in the depth of field.

3. The autofocus system as claimed in claim 2, wherein the at least one central processor calculates the depth of field based on information about diaphragm value, object distance, and focal distance obtained from the optical system.

4. The autofocus system as claimed in claim 3, wherein the at least one central processor sets a human image within the autofocus area as a target to be tracked.

5. The autofocus system as claimed in claim 2, wherein the at least one central processor sets a human image within the autofocus area as a target to be tracked.

6. The autofocus system as claimed in claim 1, wherein the at least one central processor calculates the depth of field based on information about diaphragm value, object distance, and focal distance obtained from the optical system.

7. The autofocus system as claimed in claim 6, wherein the at least one central processor sets a human image within the autofocus area as a target to be tracked.

8. The autofocus system as claimed in claim 1, wherein the at least one central processor sets a human image within the autofocus area as a target to be tracked.

* * * * *